US006763598B1

(12) United States Patent
Chen

(10) Patent No.: US 6,763,598 B1
(45) Date of Patent: Jul. 20, 2004

(54) LASER LEVEL WITH LENS SWITCHING MECHANISM

(75) Inventor: Sean Chen, Taipei (TW)

(73) Assignee: Sean & Stephen Corp., Taipei (TW)

( * ) Notice: Subject to any disclaimer, the term of this patent is extended or adjusted under 35 U.S.C. 154(b) by 0 days.

(21) Appl. No.: 10/429,772

(22) Filed: May 6, 2003

(51) Int. Cl.$^7$ ................................................ G01C 5/00
(52) U.S. Cl. ...................... 33/286; 33/451; 33/DIG. 21
(58) Field of Search ........................... 33/286, DIG. 21, 33/348, 365, 285, 290, 275 R, 274, 377, 227, 276, 281, 282, 451

(56) References Cited

U.S. PATENT DOCUMENTS

| | | | | |
|---|---|---|---|---|
| 5,359,779 A | * | 11/1994 | Polk et al. ..................... | 42/115 |
| 5,367,779 A | * | 11/1994 | Lee .............................. | 33/290 |
| 5,836,081 A | * | 11/1998 | Orosz, Jr. ..................... | 33/290 |
| 6,183,129 B1 | * | 2/2001 | Aoyama et al. ............. | 374/121 |
| 6,280,082 B1 | * | 8/2001 | Aoyama et al. ............. | 374/121 |
| 6,314,651 B1 | * | 11/2001 | Ohtomo et al. ................ | 33/290 |
| 6,427,348 B1 | * | 8/2002 | Webb ........................... | 33/286 |
| 6,588,115 B1 | * | 7/2003 | Dong ............................ | 33/227 |
| 6,694,630 B2 | * | 2/2004 | Dang et al. ................... | 33/286 |
| 2002/0073561 A1 | * | 6/2002 | Liao ............................. | 33/286 |
| 2002/0166249 A1 | * | 11/2002 | Liao ............................. | 33/451 |

* cited by examiner

Primary Examiner—Diego Gutierrez
Assistant Examiner—R. Alexander Smith
(74) Attorney, Agent, or Firm—Rosenberg, Klein & Lee

(57) ABSTRACT

A laser level with lens switching mechanism includes a shell, a level vial fitted to top of the shell, a laser module disposed in the shell, a connecting base joined to the front end of the shell, and a lens switching knob joined to the base; the connecting base has a first hole right in front of a passage formed in the shell for allowing laser light of the laser module to travel through; the base has a second hole, and locating protrusions spaced apart around the second hole on a front side; the knob has different lenses fitted around a shaft thereof, and is rotary with the shaft being passed through the second hole of the base; the knob has cavities, which fit with the locating protrusions when either one of the lenses is aligned with the passage for laser light.

2 Claims, 5 Drawing Sheets

LASER LEVEL WITH LENS SWITCHING MECHANISM

BACKGROUND OF THE INVENTION

1. Field of the Invention

The present invention relates to a laser level, more particularly one, which is equipped with a lens switching mechanism to be convenient to use.

2. Brief Description of the Prior Art

Referring to FIG. 6, a conventional laser level includes a rectangular bar 60, a level vial 70 mounted on top of the rectangular bar 60, a fixing base 62 joined to a front end of the bar 60, and a laser module 61 disposed in the bar 60. A lens 63 is secured to the fixing base 62 such that laser light from the laser module 61 can project to outside through the lens 63. The level vial 70 includes a sealed tube 71, liquid 72 in the tube 71, and an air bulb 73 in the tube 71 for checking that a surface is horizontal.

The lens 63 can be flat, horizontal corrugated or vertical corrugated on the surface, which can make laser light of the laser module 61 form a light dot, a horizontal light line or a vertical one onto a target respectively.

To use the laser level, a portion of an object to be checked out is made flatter, and then the laser level is positioned on the portion of the object to check that the surface is level, i.e. that the laser level is positioned horizontal. Thus, laser light from the laser module 61 projects through the lens 63 onto a target to form a reference light mark on the target for indicating a portion of the target that is as high as the horizontal surface of the above object.

To project a reference laser dot onto the target, the user has to use a laser level of the kind, to which a flat lens is fitted; to project a horizontal laser line onto the target, the user has to substitute another laser level, to which a horizontal corrugated lens is fitted, for the original one, and the user has to use yet another laser level instead, to which a vertical corrugated lens is fitted, for projecting a vertical laser line onto the target.

From the above description, it can be easily understood that the conventional laser level has disadvantages as followings:

1. The user has to prepare and carry three laser levels, which are respectively equipped with flat, horizontal corrugated, and vertical corrugated lenses, causing inconvenience and costing more money.
2. Every time after the user switches from one level to another on the same target, he has to recheck that the level is positioned horizontal, causing inconvenience to him.

SUMMARY OF THE INVENTION

It is a main object of the present invention to provide a laser level, which is equipped with a lens switching mechanism capable of being used for easily and conveniently switching from one of various kinds of lenses to another.

The laser level includes a shell, a level vial fitted to top of the shell, a laser module disposed in the shell, a connecting base joined to the front end of the shell, and a lens switching knob joined to the base; the connecting base has a first hole right in front of a passage formed in the shell for allowing laser light of the laser module to travel through; the base has a second hole; the knob has different lenses fitted around a shaft, and is turnably joined to the base with the shaft thereof being passed through the second hole of the base.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
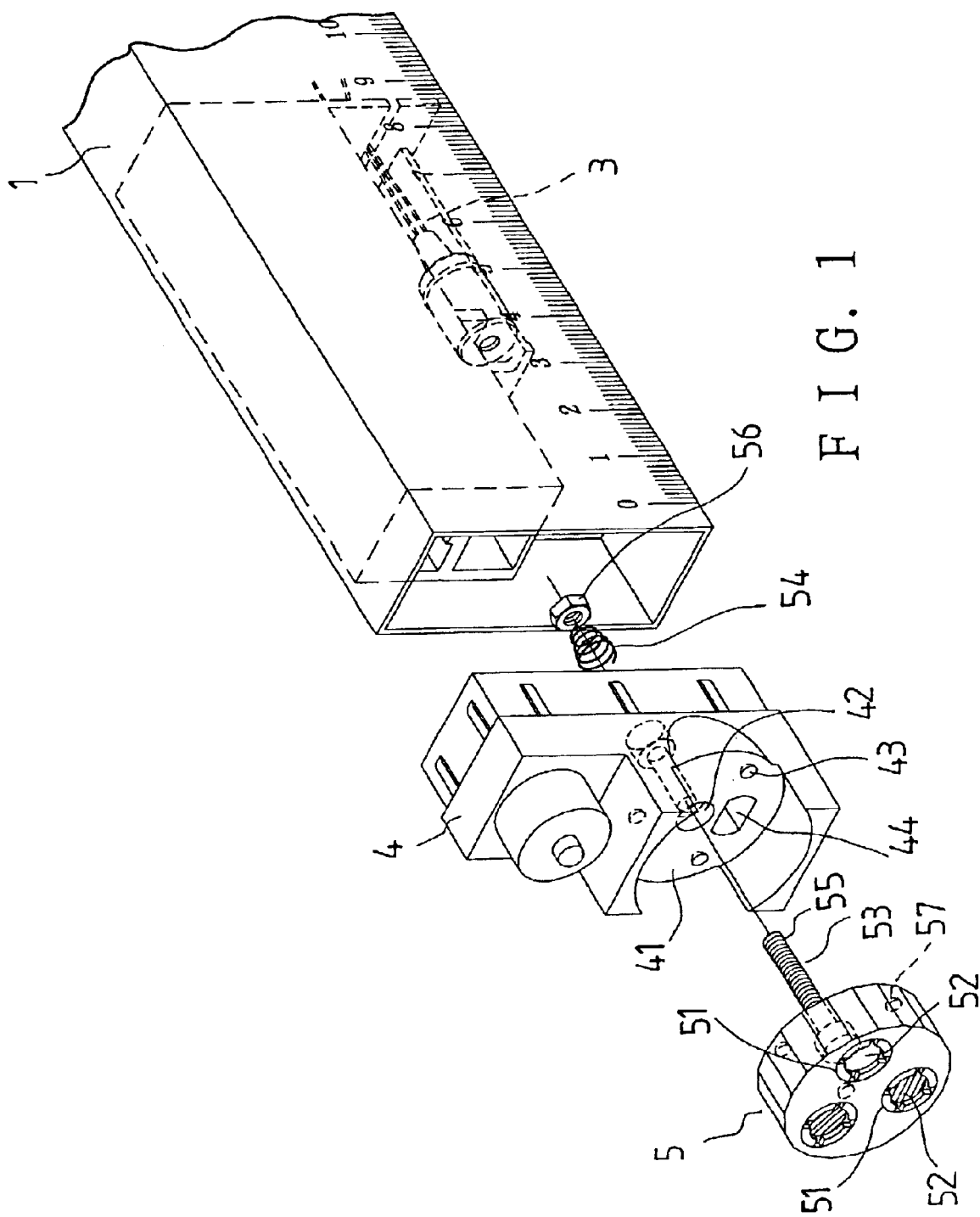
FIG. 1 is an exploded perspective view of the laser level according to the present invention.

Referring to FIGS. 1 to 4, a preferred embodiment of a laser level in the present invention includes a rectangular shell 1, a level vial 2 mounted on top of the rectangular shell 1, a laser module 3 disposed in the shell 1, a connecting base 4 joined to a front end of the shell 1, and a lens switching knob 5 rotary on the connecting base 4.

The level vial 2 is the same as conventional level vials, including a sealed tube, liquid in the tube, and an air bulb in the tube for checking that a surface is horizontal.

The connecting base 4 has a contacting side 41 on a front, a through hole 42 on the middle of the contacting side 41, a through projecting hole 44 on the contacting side 41, and locating protrusions 43 spaced apart around the through hole 42 on the contacting side 41. The laser module 3 is located such that laser light from it can be projected to outside through the projecting hole 44 of the base 4, i.e. the projecting hole 44 is right in front of a passage, which is formed in the shell 1 for allowing laser light of the laser module 3 to travel through.

The lens switching knob 5 has several holding holes 51 spaced apart around a center thereof, a shaft 53 projecting rearwards along a central axis thereof, and cavities 57 spaced apart around the center on the rear side thereof; the shaft 53 is formed with screwed threads on a rear end portion thereof. A flat lens, a horizontal corrugated lens, i.e. a lens having a horizontal corrugated surface, and a vertical corrugated lens, i.e. a lens having a vertical corrugated surface, are fitted to respective ones of the holding holes 51 of the lens switching knob 5, which can make laser light of the module 3 form a reference light dot, a horizontal reference light line, and a vertical one onto a target respectively when the laser light passes through them.

Figure 5:
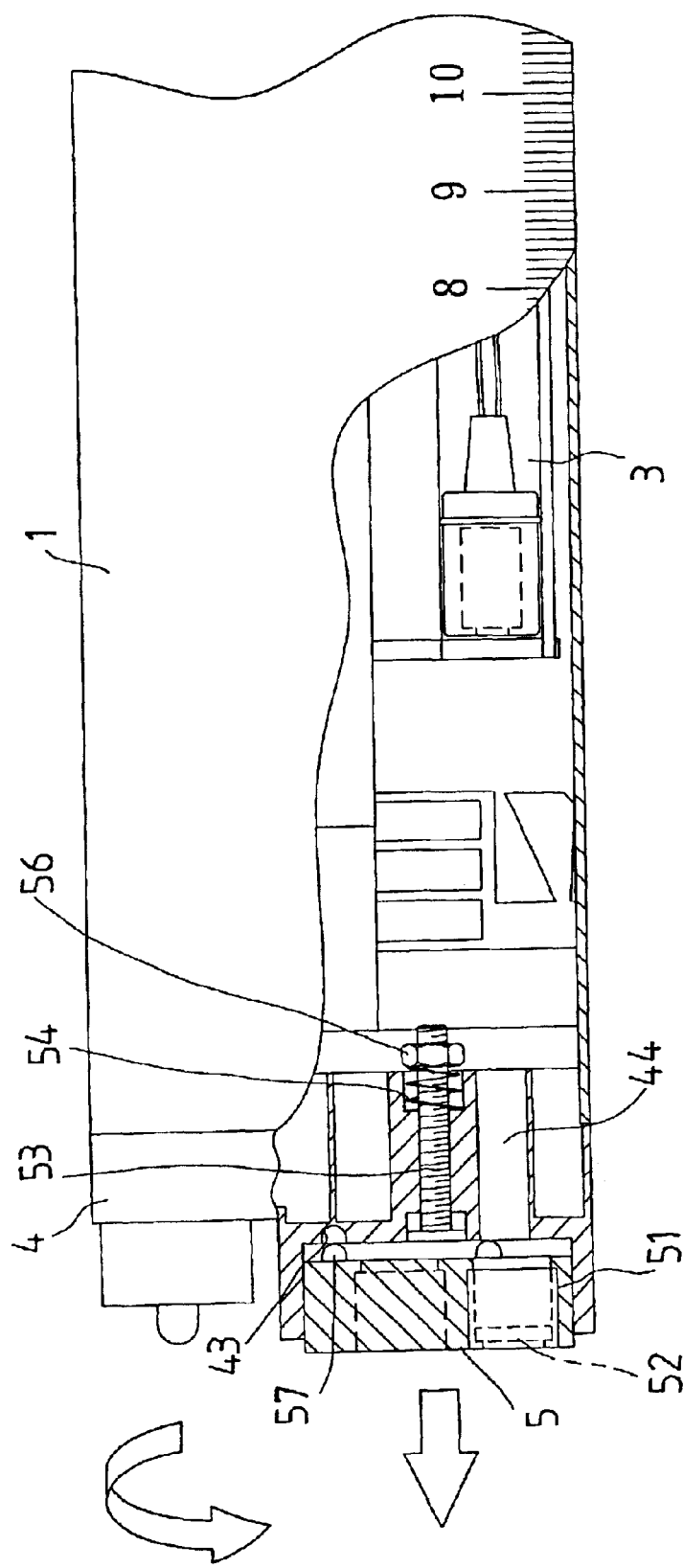
FIG. 5 is a partial vertical cross-sectional view of the laser level of the present invention with the lens switching mechanism being in use.
Figure 6:
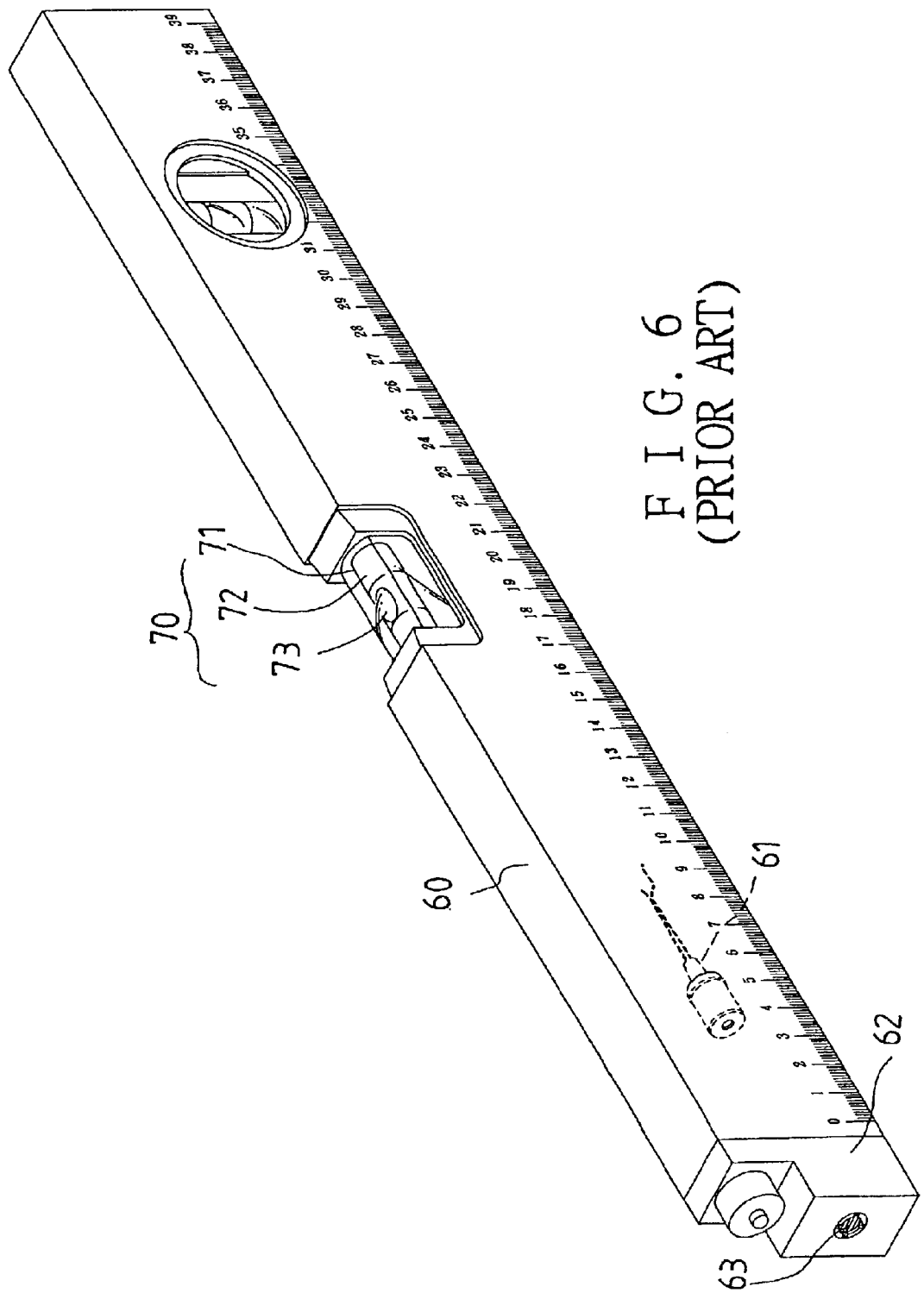
FIG. 6 is a perspective view of the conventional laser level as described in the Background.

The lens switching knob 5 is joined to the connecting base 4 with the shaft 53 being passed through the through hole 42 and an elastic element 54, and with the threaded rear end portion 55 being screwed into a nut 56 therefore the knob 5 can be turned in relation to the base 4. Thus, the knob 5 can be turned to make one of the lenses 52 faces the projecting hole 44 of the connecting base 4, as shown in FIG. 5; the cavities 57 will fit with corresponding locating protrusions 43 of the base 4 when either one of the lenses 52 is right in front of the projecting hole 44; for making the knob 5 to be easily turned, the knob 5 has to be first slightly pulled away from the contacting side 41 of the base 4 for the cavities 57 to disengage the locating protrusions 43.

Figure 2:
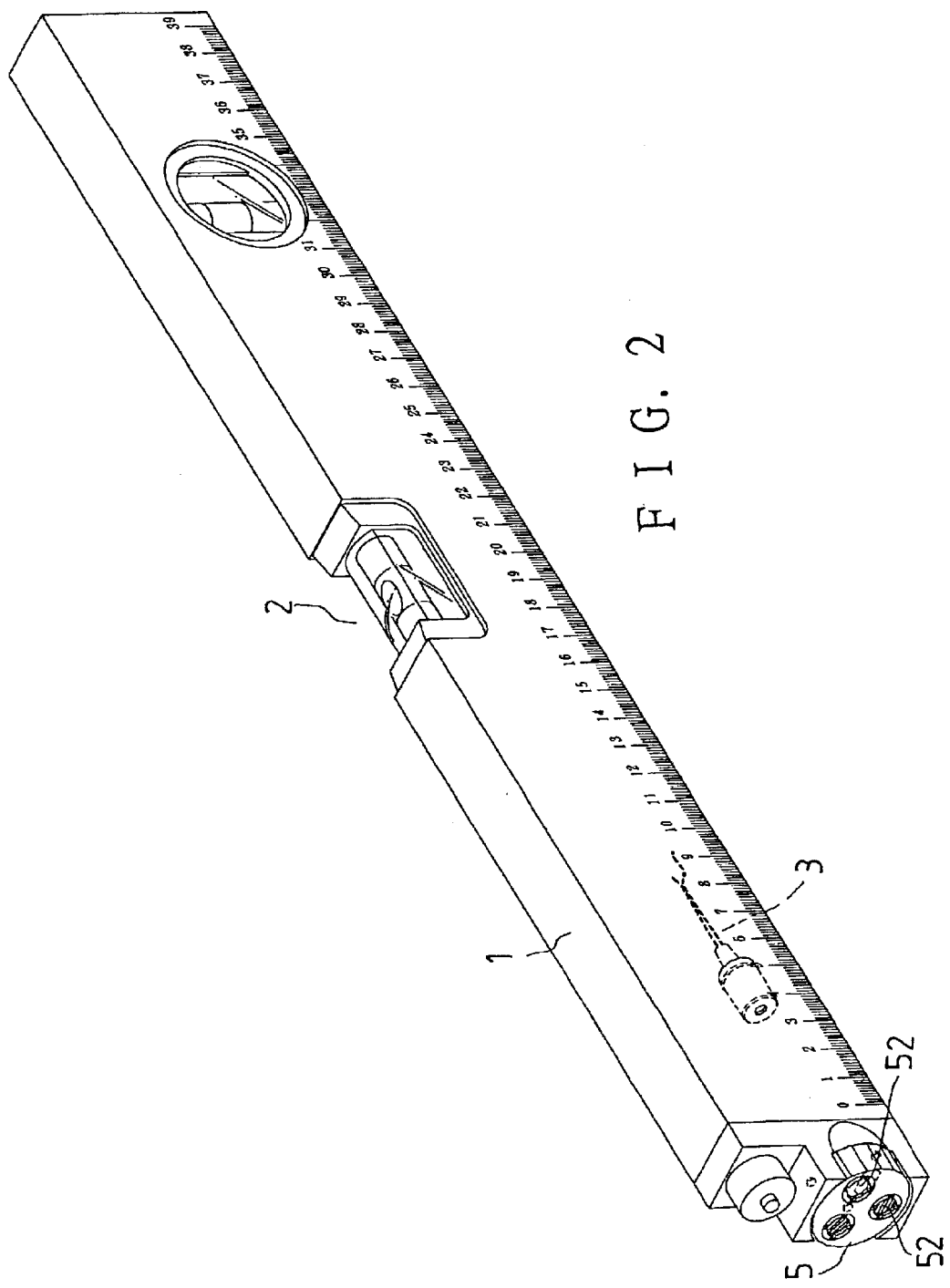
FIG. 2 is a perspective view of the laser level according to the present invention.
Figure 3:
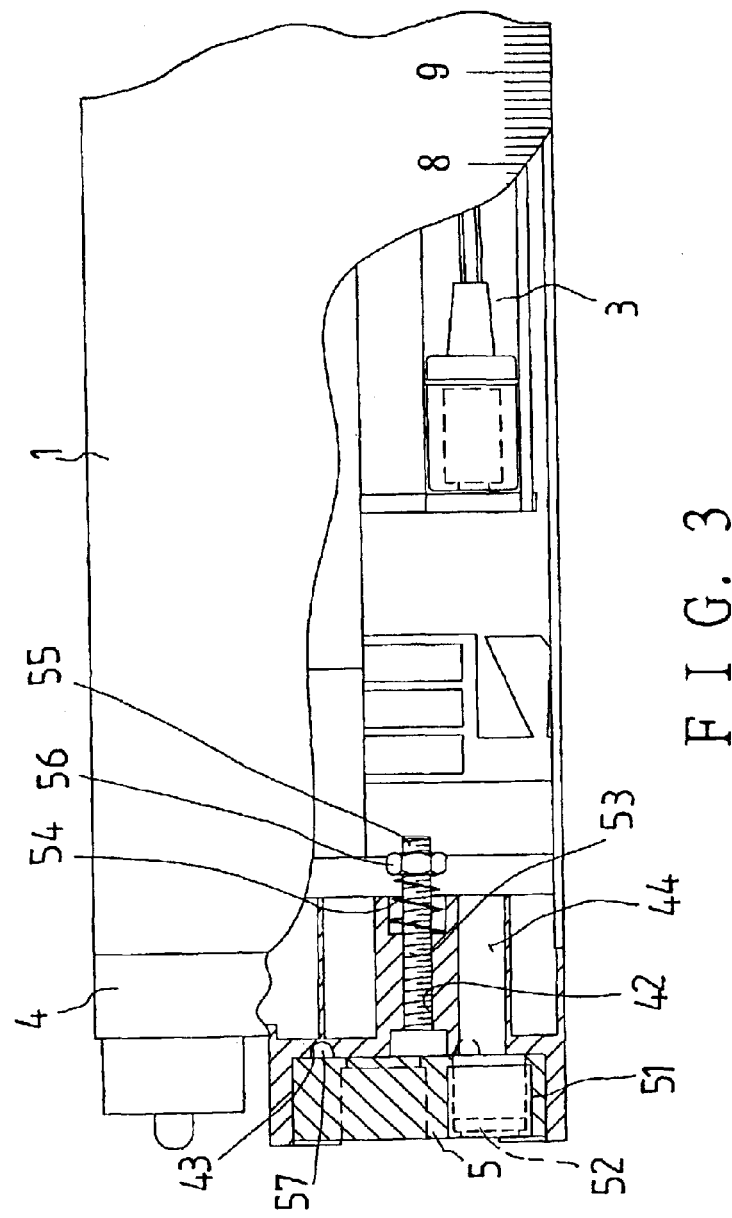
FIG. 3 is a partial vertical cross-sectional view of the laser level according to the present invention.
Figure 4:
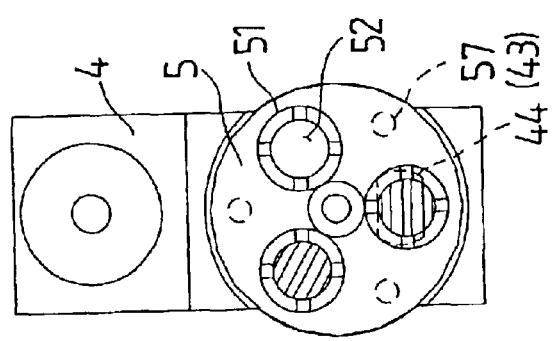
FIG. 4 is a front view of the laser level according to the present invention.

Referring to FIG. 2, to use the present laser level, the laser level is positioned on a flat portion of an object to be checked out to check that the surface is level by means of the level vial 2, i.e. to check that the laser level is positioned horizontal. And, laser light of the laser module 3 is projected through one of the lenses 52 onto a target to form a reference light mark on the target for use; to project a laser reference dot onto the target, the user only has to turn the knob 5 until the flat lens is right in front of the projecting hole 44; to project a laser horizontal reference line onto the target with the laser level, the user turns the knob 5 until the horizontal corrugated lens is right in front of the projecting hole 44, and for projecting a laser vertical reference line onto the target, the user turns the knob S until the vertical corrugated lens is right in front of the projecting hole 44.

From the above description, it can be easily understood that the laser level of the present invention has advantages as followings:

1. A user only has to prepare or bring single laser level to use various kinds of lenses because different lenses have been fitted to a switching knob of the level.
2. To change the shape of light mark formed on a target by means of laser light of the laser module to a different one, the user only has to turn the lens switching knob, not having to substitute another level for the original one. Therefore, the user doesn't have to move the laser level for changing lenses. Consequently, the user doesn't have to frequently recheck that the laser level is positioned on a level surface, saving him a lot of labor.

What is claimed is:

1. A laser level with lens switching mechanism, comprising a shell, a level vial fitted to top of the shell, a laser module disposed in the shell for projecting laser light through a front end of the shell, a connecting base joined to the front end of the shell; the connecting base having a first through hole right in front of a passage for laser light of the laser module; the base having a second through hole, and locating protrusions spaced apart around the second through hole on a front side of the base; and a lens switching knob turnably joined to the base with a rearwards-projecting shaft being passed through the second through hole of the base; the knob having a plurality of different lenses fitted thereto around the shaft thereof; the knob having cavities spaced apart around the shaft on a rear side thereof; the cavities fitting with respective ones of the locating protrusions of the connecting base when one of the lenses faces the first through hole of the connecting base.

2. The laser level with lens switching mechanism as claimed in claim 1, wherein the shaft is further passed through, after having been passed through the second through hole of the connecting base, an elastic element, and screwed into a nut in sequence.

* * * * *